US009955388B2

(12) United States Patent
Jung et al.

(10) Patent No.: US 9,955,388 B2
(45) Date of Patent: Apr. 24, 2018

(54) METHOD AND APPARATUS FOR TRANSMITTING RADIO LINK CONTROL STATUS REPORT IN COMMUNICATION SYSTEM BASED ON MULTIPLE RADIO ACCESS TECHNOLOGIES

(71) Applicant: Samsung Electronics Co., Ltd., Suwon-si, Gyeonggi-do (KR)

(72) Inventors: Ha-Kyung Jung, Seoul (KR); Sang-Wook Kwon, Yongin-si (KR); Jung-Shin Park, Seoul (KR); Yeong-Moon Son, Yongin-si (KR); Sang-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 14/167,308

(22) Filed: Jan. 29, 2014

(65) Prior Publication Data
US 2015/0289171 A1    Oct. 8, 2015

(30) Foreign Application Priority Data

Jan. 29, 2013 (KR) .......................... 10-2013-0009938

(51) Int. Cl.
| | |
|---|---|
| *H04W 36/00* | (2009.01) |
| *H04L 1/00* | (2006.01) |
| *H04L 12/26* | (2006.01) |
| *H04L 1/16* | (2006.01) |
| *H04L 1/18* | (2006.01) |

(52) U.S. Cl.
CPC ....... *H04W 36/0055* (2013.01); *H04L 1/0001* (2013.01); *H04L 1/1621* (2013.01); *H04L 1/1848* (2013.01); *H04L 43/06* (2013.01); *H04L 43/0852* (2013.01)

(58) Field of Classification Search
CPC ... H04L 43/06; H04L 1/0001; H04W 36/0055
See application file for complete search history.

(56) References Cited

U.S. PATENT DOCUMENTS

| | | | | |
|---|---|---|---|---|
| 4,745,599 | A * | 5/1988 | Raychaudhuri | ............... 370/348 |
| 2006/0187955 | A1 | 8/2006 | Rezaiifar et al. | |
| 2007/0091810 | A1 | 4/2007 | Kim et al. | |
| 2008/0219204 | A1 | 9/2008 | Lee et al. | |
| 2009/0046593 | A1* | 2/2009 | Ptasinski | ............... H04L 1/0003 370/252 |
| 2009/0168650 | A1* | 7/2009 | Kesselman | ........... H04W 88/06 370/235 |

(Continued)

FOREIGN PATENT DOCUMENTS

WO    2009/057074 A2    5/2009

*Primary Examiner* — Omer S Mian
(74) *Attorney, Agent, or Firm* — Jefferson IP Law, LLP

(57) ABSTRACT

A method for transmitting a status report in a communication system based on multiple Radio Access Technologies (RATs) is provided. The method includes, when missing sequence numbers are detected from sequence numbers of packets stored in a reception buffer, identifying whether there are one or more sequence numbers which have not been received due to a transmission delay time difference between the multiple RATs in the missing sequence numbers, and when there are one or more sequence numbers in the missing sequence numbers, delaying transmission of the status report.

10 Claims, 9 Drawing Sheets

(56) References Cited

U.S. PATENT DOCUMENTS

| | | |
|---|---|---|
| 2009/0252143 A1 | 10/2009 | Sridhara et al. |
| 2010/0190504 A1 | 7/2010 | Lee et al. |
| 2010/0215006 A1 | 8/2010 | Ho et al. |
| 2010/0325507 A1* | 12/2010 | Sung .................... H04L 1/1867 714/749 |
| 2011/0013567 A1 | 1/2011 | Torsner et al. |
| 2011/0044192 A1 | 2/2011 | Wang et al. |
| 2011/0228746 A1 | 9/2011 | Chun et al. |
| 2012/0044821 A1* | 2/2012 | Kim ....................... H04L 5/001 370/252 |
| 2012/0082096 A1 | 4/2012 | Cave et al. |
| 2012/0163161 A1* | 6/2012 | Zhang et al. ................. 370/216 |
| 2012/0281564 A1* | 11/2012 | Zhang et al. ................. 370/252 |
| 2012/0289170 A1 | 11/2012 | Li et al. |
| 2012/0314648 A1* | 12/2012 | Zhang et al. ................. 370/328 |
| 2013/0315139 A1* | 11/2013 | Abraham et al. ............. 370/328 |
| 2014/0301223 A1* | 10/2014 | Wong et al. ................. 370/252 |

* cited by examiner

METHOD AND APPARATUS FOR TRANSMITTING RADIO LINK CONTROL STATUS REPORT IN COMMUNICATION SYSTEM BASED ON MULTIPLE RADIO ACCESS TECHNOLOGIES

CROSS-REFERENCE TO RELATED APPLICATION(S)

This application claims the benefit under 35 U.S.C. § 119(a) of a Korean patent application filed on Jan. 29, 2013 in the Korean Intellectual Property Office and assigned Serial number 10-2013-0009938, the entire disclosure of which is hereby incorporated by reference.

TECHNICAL FIELD

The present disclosure relates to a method and an apparatus for transmitting a status report in a multi-Radio Access Technology (RAT) communication system supporting different RATs. More particularly, the present disclosure relates to a method for generating a status report based on non-received packets due to a transmission delay time difference between different radio access links and transmitting the generated status report to a transmitting side.

BACKGROUND

In general, a Radio Link Control (RLC) layer of a cellular network performs retransmission of a failed transmission of an RLC Protocol Data Unit (PDU) to provide reliable communication. For the retransmission of a failed transmission of an RLC PDU, an RLC entity of a receiving side (hereinafter referred to as a "reception RLC entity") generates a status report recording a status including "success" or "failure" of reception of each of RLC PDUs received up to a current time from an RLC entity of a transmitting side (hereinafter referred to as a "transmission RLC entity"). Further, the reception RCL entity transmits the status report generated as described above to the transmission RLC entity. The generation of the status report may be largely divided into two types. In a first type, when the reception RLC entity detects reception failure of the RLC PDU, the reception RLC entity generates a status report by itself without a request of the transmission RLC and transmits the generated status report to the transmission RLC entity. In a second type, the transmission RLC entity explicitly transmits a request for the status report to the reception RLC entity. Thereafter, the reception RLC entity generates the status report and responds to the request.

Hereinafter, an RLC supporting a function of dividing one data stream into two or more radio access links, that is, Radio Access Technologies (RATs) and transmitting the divided RATs is defined as a multi-RAT RLC. In general, different radio access links have different transmission delay times by different characteristics of corresponding radio channels or different characteristics of protocols used in the radio channels. Accordingly, RLC PDUs transmitted through different radio access links by the multi-RAT RLC may experience different delay times. Hereinafter, such a delay is defined as an asymmetric transmission delay (hereinafter referred to as "skew").

The receiving side receives a packet transmitted through a radio access link having a relatively short transmission delay time and, at a later time, receives a packet transmitted through a radio access link having a relatively long transmission delay time among packets almost simultaneously transmitted through a plurality of radio access links by the transmitting side. Accordingly, the receiving side receives out-of-order packets. Alternatively, a time point may exist when the receiving side receives the packet transmitted through the radio access link having the relatively short delay time but does not receive the packet transmitted through the radio access link having the relatively long delay time. In such a time point, in a point of view of a reception buffer of the RLC layer of the receiving side, the packet received through the radio access link having the relatively long delay time among packets which have not been received seems to be lost during the transmission.

In transmitting a status report to the transmission RLC entity, if the reception RLC entity transmits the status report without regard to the delay time generated due to a transmission delay time difference between different radio access links, a status report indicating transmission failure may be transmitted for packets which can be successfully received after a little delay time with a changed order. In this event, unnecessary retransmission by the transmitting side is made, and thus radio resources are wasted.

Therefore, a need exists for a method and an apparatus for transmitting a status report in a multi-RAT communication system supporting different RATs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for generating a status report based on non-received packets due to a transmission delay time difference between different radio access links and transmitting the generated status report to a transmitting side.

In accordance with an aspect of the present disclosure, a method for transmitting a status report in a communication system based on multiple Radio Access Technologies (RATs) is provided. The method includes, when missing sequence numbers are detected from sequence numbers of packets stored in a reception buffer, identifying whether there are one or more sequence numbers which have not been received due to a transmission delay time difference between the multiple RATs in the missing sequence numbers, and when there are one or more sequence numbers which have not been received in the missing sequence numbers, delaying transmission of the status report.

In accordance with another aspect of the present disclosure, a method for receiving a status report in a communication system based on multiple RATs is provided. The method includes identifying, from status reports received from a receiving side, whether there are sequence numbers of one or more packets which have not been received due to a transmission delay time difference between the multiple RATs in packets having been initially transmitted to the receiving side, and when there are sequence numbers of the one or more packets which have not been received in the packets transmitted to the receiving side, determining reception statuses of the one or more packets of the receiving side according to whether the one or more packets have been initially transmitted.

In accordance with another aspect of the present disclosure, a receiving apparatus for transmitting a status report in a communication system based on multiple RATs is provided. The receiving apparatus includes a controller configured to identify, when missing sequence numbers are detected from sequence number of packets stored in a reception buffer, whether there are one or more sequence numbers which have not been received due to a transmission delay time difference between the multiple RATs in the missing sequence numbers, and to delay transmission of the status report when there are one or more sequence numbers which have not been received in the missing sequence numbers.

In accordance with another aspect of the present disclosure, a transmitting apparatus for receiving a status report in a communication system based on multiple RATs is provided. The transmitting apparatus includes a controller configured to identify, from status reports received from a receiving side, whether there are sequence numbers of one or more packets which have not been received due to a transmission delay time difference between the multiple RATs in packets having been initially transmitted to the receiving side, and to determine reception statuses of the one or more packets of the receiving side according to whether the one or more packets have been initially transmitted when there are sequence numbers of the one or more packets which have not been received in the packets transmitted to the receiving side.

In embodiments of the present disclosure, when packets are transmitted between transmission Radio Link Control (RLC) entities and reception RLC entities of a transmitting side and a receiving side through different radio access links, unnecessary retransmission by a transmission RLC entity and waste of radio resources by controlling time points is reduced when corresponding status reports are transmitted based on a transmission delay time difference between the different radio access links, that is, transmission paths and identifying a packet which has not yet been received due to a transmission delay.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions related to well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure provides a method and an apparatus in which, when a transmission Radio Link Control (RLC) entity transmits one data stream to a reception RLC entity through a plurality of radio access links, that is, Radio Access Technologies (RATs) in a multi-RAT communication system supporting different RATs, the reception RLC entity generates a status report based on a delay time of each of the radio access links and transmits the generated status report to the transmission RLC entity.

Figure 1A:
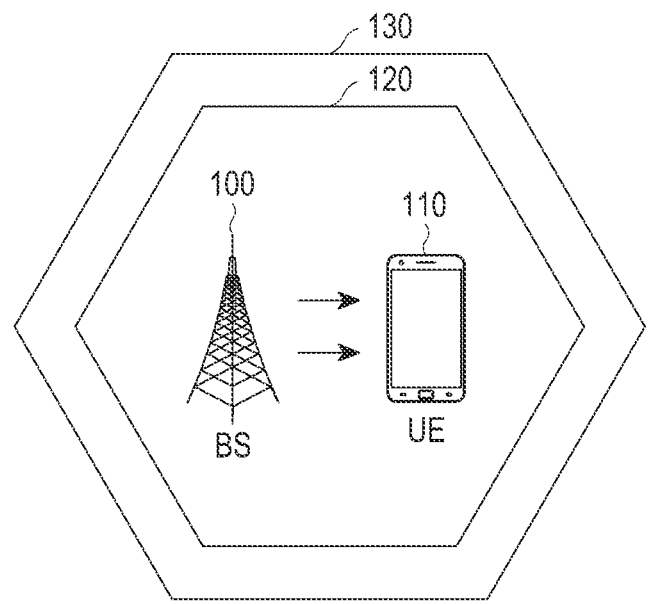
FIGS. 1A and 1B illustrate a case where a transmitting side transmits packets to a receiving side through a plurality of radio access links in a multi-Radio Access Technology (multi-RAT) communication system according to an embodiment of the present disclosure.
Figure 1B:
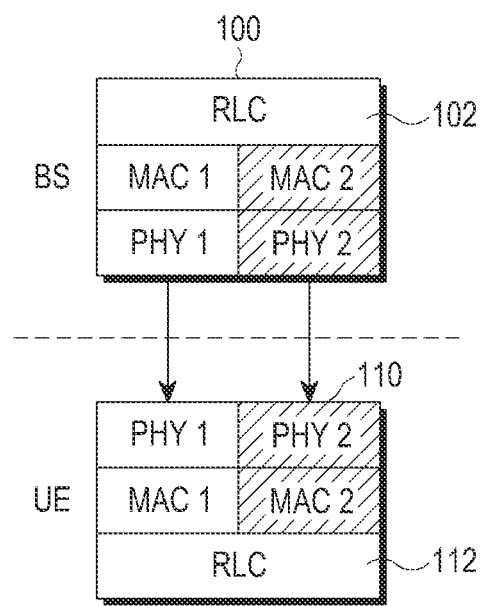

FIGS. 1A and 1B illustrate a case where a transmitting side transmits packets to a receiving side through a plurality of radio access links in a multi-RAT communication system according to an embodiment of the present disclosure.

Referring to FIG. 1A, for example, it is assumed that a Base Station (BS) 100 supports two different RATs. A service coverage of a first RAT of the two RATs corresponds to an outer area 130 having a relatively wide transmission range of the RAT among service coverage of the BS and a MAC1 layer, and a PHY1 layer of FIG. 1B are mapped to the service coverage of the first RAT. A service coverage of a second RAT of the two RATs corresponds to an inner area 120 having a relatively narrow transmission range of the RAT among the service coverage of the BS, and a MAC2 layer and a PHY2 layer of FIG. 1B are mapped to the service coverage of the second RAT. Further, it is assumed that a User Equipment (UE) 110 is located at an area where the first RAT and the second RAT overlap each other. Although it is assumed that a number of RATs of the BS 100 is two for convenience of description, the present disclosure can be equally applied to a case where a number of radio access links is two or more.

Referring to FIG. 1B, the UE 110 performing downlink communication with the BS 100 includes, for example, a reception RLC layer 112, and different MAC layers and PHY layers corresponding to the first RAT and the second RAT.

Meanwhile, for convenience of description, FIGS. 1A and 1B illustrate a situation of the downlink communication where the BS 100 corresponding to an example of the transmitting side includes a transmission RLC layer 102 and the UE 110 corresponding to an example of the receiving side includes the reception RLC layer 112. However, it should be noted that the present disclosure can be equally applied to a case where the BS 100 corresponding to another example of the receiving side includes the reception RLC layer and the UE 110 corresponding to another example of the transmitting side includes the transmission RLC layer.

Figure 2:
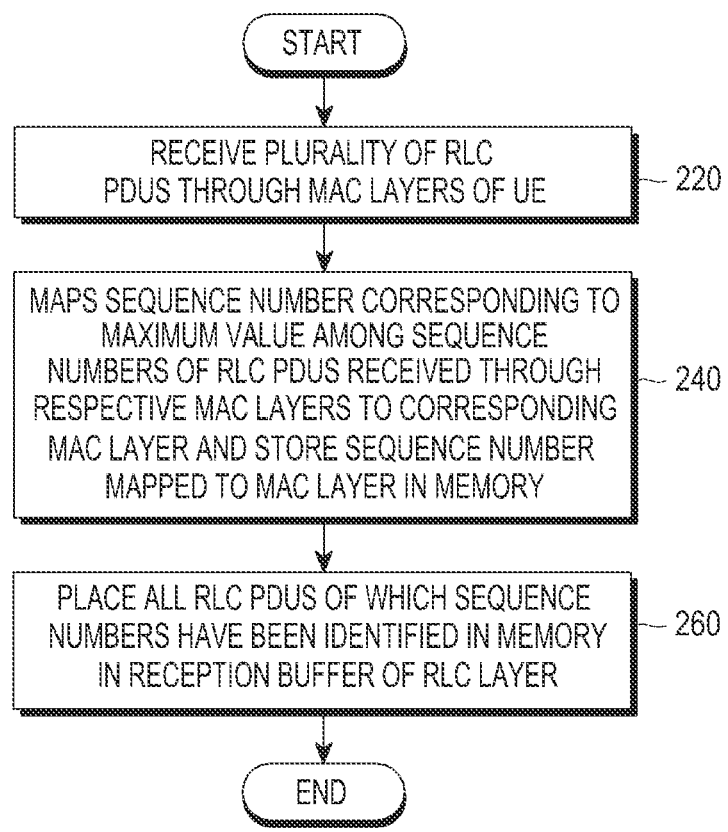
FIG. 2 is a flowchart illustrating operations for receiving and processing Radio Link Control Protocol Data Units (RLC PDUs) through a plurality of radio access links in a multi-RAT communication system according to an embodiment of the present disclosure.

FIG. 2 is a flowchart illustrating operations for receiving and processing RLC Protocol Data Units (PDUs) through a plurality of radio access links in a multi-RAT communication system according to an embodiment of the present disclosure. The reception RLC layer can also be applied to a configuration of the receiving side, that is, the UE in the downlink communication or a configuration of the receiving side, that is, the BS in the uplink communication.

Referring to FIG. 2, in operation 220, the reception RLC layer of the receiving side receives a plurality of RLC PDUs through MAC layers of the receiving side. In operation 240, the reception RLC layer maps a sequence number corresponding to a maximum value among sequence numbers of the RLC PDUs received through the respective MAC layers to the corresponding MAC layer and stores the sequence number mapped to MAC layer in a memory. For example, in FIG. 1B, it is assumed that a maximum value of sequence numbers of RCL PDUs received through the "MAC 1 layer" corresponding to one of the MAC layers is "10" and a maximum value of sequence numbers of RLC PDUs received through the "MAC 2 layer" is "20". In this event, the memory stores identification numbers of the MAC layers and the maximum values of the sequence numbers of the PDUs received through the corresponding MAC layers in a mapped form, for example, (MAC 1 layer, 10) and (MAC 2 layer, 20). In operation 260, the reception RLC layer sequentially places all the RLC PDUs having passed through the sequence number identification in operation 240 in a reception buffer of the RLC layer according to an order of the sequence number.

Figure 3:
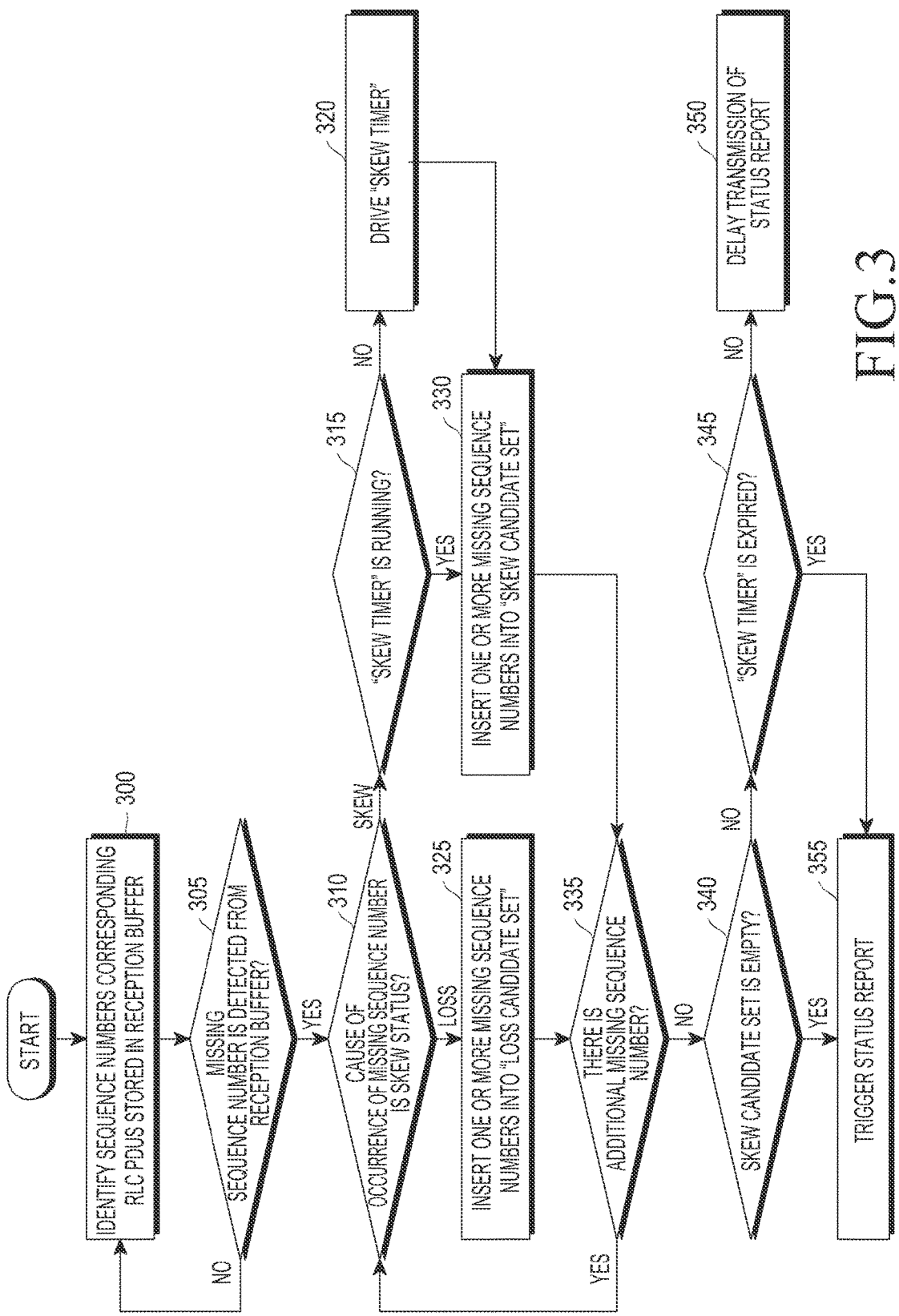
FIG. 3 is a flowchart illustrating operations in which a reception RLC layer determines asymmetric transmission delays of corresponding RLC PDUs received through different RATs based on a state of a reception buffer and decides on transmission of a status report according to an embodiment of the present disclosure.

FIG. 3 is a flowchart illustrating operations in which the reception RLC layer determines asymmetric transmission delays of the corresponding RLC PDUs received through different RATs based on a state of the reception buffer and decides on transmission of a status report according to an embodiment of the present disclosure. Hereinafter, it is assumed that the reception RLC layer is the RLC layer 112 of FIG. 1 for convenience of description. However, the reception RLC layer to which the present disclosure is applied is equally applied to the RLC layer of the BS corresponding to the receiving side in the uplink communication as well as the UE in the downlink communication.

Referring to FIG. 3, for example, the reception RLC layer 112 identifies sequence numbers corresponding to RLC PDUs stored in a reception buffer of the reception RLC layer 112 in operation 300. At this time, the reception RLC layer 112 may perform the identification operation according to a time period, whenever a new RLC PDU is located at the RLC reception buffer, or when a request for the status report is received from the receiving side.

As a result of the identification, when a missing sequence number is not detected from the sequence numbers corresponding to the RLC PDUs stored in the reception buffer ("NO" in operation 305), the reception RLC layer 112 returns to operation 300. Based on an assumption that the sequence numbers are sequentially stored in the reception buffer, the missing sequence numbers refer to sequence numbers which are not stored in the reception buffer among the sequence numbers less than a maximum value of the stored sequence numbers.

As a result of the identification, when one or more missing sequence numbers are detected from the sequence numbers corresponding to the RLC PDUs stored in the reception buffer ("YES" in operation 305), the reception RLC layer 112 determines a cause of an occurrence of the one or more missing sequence numbers in operation 310. More specifically, the reception RLC layer 112 determines whether the cause of the occurrence is an asymmetric transmission delay of each of the different RATs (hereinafter, referred to as a "skew" status) or loss due to transmission failure of the transmitting side (hereinafter referred to as a "loss" status). An operation of determining the cause of the occurrence of the missing sequence number will be described with reference to FIG. 4 below. As a result of the determination, when the cause of the occurrence of the one or more missing sequence numbers corresponds to the skew status, the reception RLC layer 112 identifies whether a "skew timer" is running in operation 315. As a result of the identification, when the skew timer does not run, the reception RLC layer 112 runs the skew timer in operation 320 since a new skew event is generated for the one or more missing sequence numbers, and proceeds to operation 330. At this time, the skew timer is set to a maximum time for which the reception RLC layer 112 can delay feedback of the request for the status report received from the transmission RLC layer. More specifically, a value of the skew timer may be received from the transmission RLC layer or set as a pre-arranged default value.

As a result of the identification, when there is the skew timer which is already running or after operation 320 is performed, the reception RLC layer 112 adds the one or more missing sequence numbers to a "skew candidate set" in operation 330 and proceeds to operation 335. The RLC PDUs corresponding to the sequence numbers included in the skew candidate set have not yet been received due to a transmission time difference between different RATs but are considered as being received soon.

Meanwhile, when the reception RLC layer 112 identifies that the cause of the occurrence of the one or more missing sequence numbers corresponds to the loss status in operation 310, the reception RLC layer 112 adds the one or more missing sequence numbers to a "loss candidate set" in operation 325. The loss candidate set is a set of RLC PDUs estimated in the loss status, that is, a loss status due to transmission failure of the transmitting side. Accordingly, the RLC PDUs included in the loss candidate set correspond to targets of which reception results in the status reports are fed back using a Non-ACKnowledgement (NACK) signal by the reception RLC layer 112.

Thereafter, in operation 335, the reception RLC layer 112 identifies whether there is an additional missing sequence number in the reception buffer. As a result of the identification, when there is the additional missing sequence number, the reception RLC layer 112 returns to operation 310. As a result of the identification, when there are no more missing sequence numbers, the reception RLC layer 112 identifies whether the skew candidate set is empty in operation 340. As described above, the RLC PDUs corresponding to the missing sequence numbers included in the skew candidate set are simply RLC PDUs which have not yet been received due to a transmission time difference between the different RATs, and are considered as potentially being received soon. Accordingly, the RLC PDUs corresponding to the sequence numbers included in the skew candidate set are in the skew status where the RLC PDUs have not yet been received due to the transmission time difference between the different RATs but will be received soon. Therefore, if a reception result of the corresponding RLC PDU is fed back using the NACK signal in the status report through the fact that the RLC PDU is currently missing, it is highly likely to cause unnecessary retransmission of the transmitting side.

Accordingly, as a result of the identification in operation 340, when the skew candidate set is empty, the process proceeds to operation 355 and triggers transmission of the status report to the transmitting side. As a result of the identification in operation 340, when the skew candidate set is not empty, the reception RLC layer 112 identifies whether a driving time of the skew timer which is running has expired in operation 345. As a result of the identification, when the driving time of the skew timer is already expired, the reception RLC layer 335 proceeds to operation 355 and transmits the status report to the transmitting side. As a result of the identification, when the driving time of the skew timer has not expired, the reception layer 112 delays the transmission of the status report to the transmitting side in operation 350. Thereafter, although not illustrated in the drawings, the reception RLC layer 112 identifies again whether the driving time of the skew timer has expired after a time and transmits the status report to the transmitting side when the driving time has expired.

Figure 4:
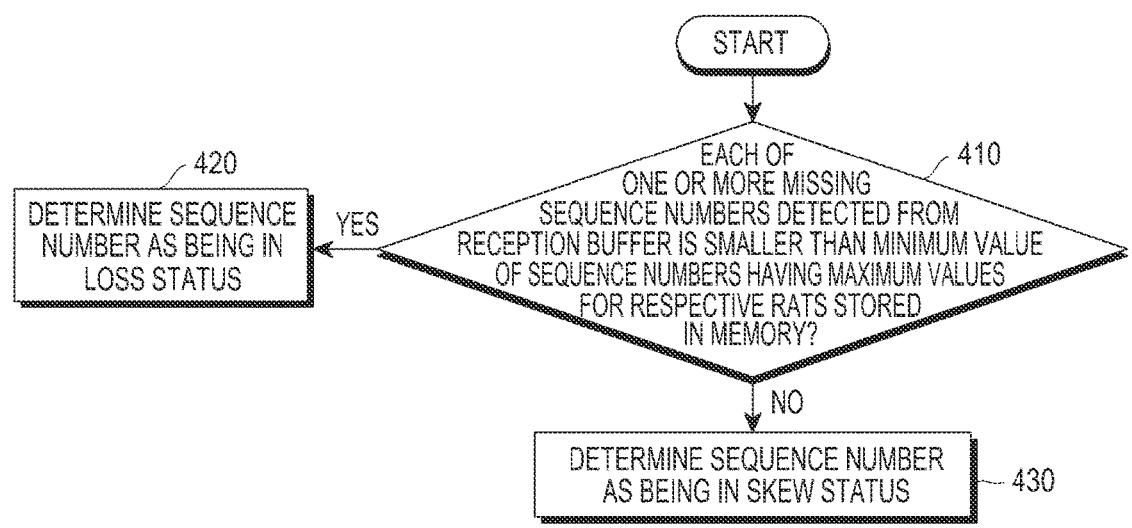
FIG. 4 is a flowchart illustrating operations in which a reception RLC layer determines a cause of an occurrence of a missing sequence number in a reception buffer according to an embodiment of the present disclosure.

FIG. 4 is a flowchart illustrating operations in which the reception RLC layer determines a cause of an occurrence of a missing sequence number in a reception buffer according to an embodiment of the present disclosure. The operations of FIG. 4 correspond to operations of determining the cause of the occurrence of the missing sequence number in operation 310 performed when the missing sequence number is detected in operation 305 of FIG. 3. Further, it is assumed that the reception RLC layer 112 stores sequence numbers of RLC PDUs received through the two RATs, that is, respective MAC layers as illustrated in FIG. 2.

Referring to FIG. 4, in operation 410, the reception RLC layer 112 compares each of the one or more missing sequence numbers detected in the reception buffer with sequence numbers having maximum values among the sequence numbers of the RLC PDUs received through the respective MAC layers which have been stored in the memory in operation 240 of FIG. 2. As a result of the comparison, the reception RLC layer 112 determines an RLC PDU corresponding to a sequence number which is less than a minimum value of the sequence numbers having the maximum values stored in the memory among the one or more missing sequence numbers as being in the "loss" status in operation 420.

In contrast, as a result of the comparison, the reception RLC layer 112 determines an RLC PDU corresponding to a sequence number which is larger than the minimum value of the sequence numbers having the maximum values stored in the memory among the one or more missing sequence numbers as being in the "skew" status in operation 430.

Figure 5:
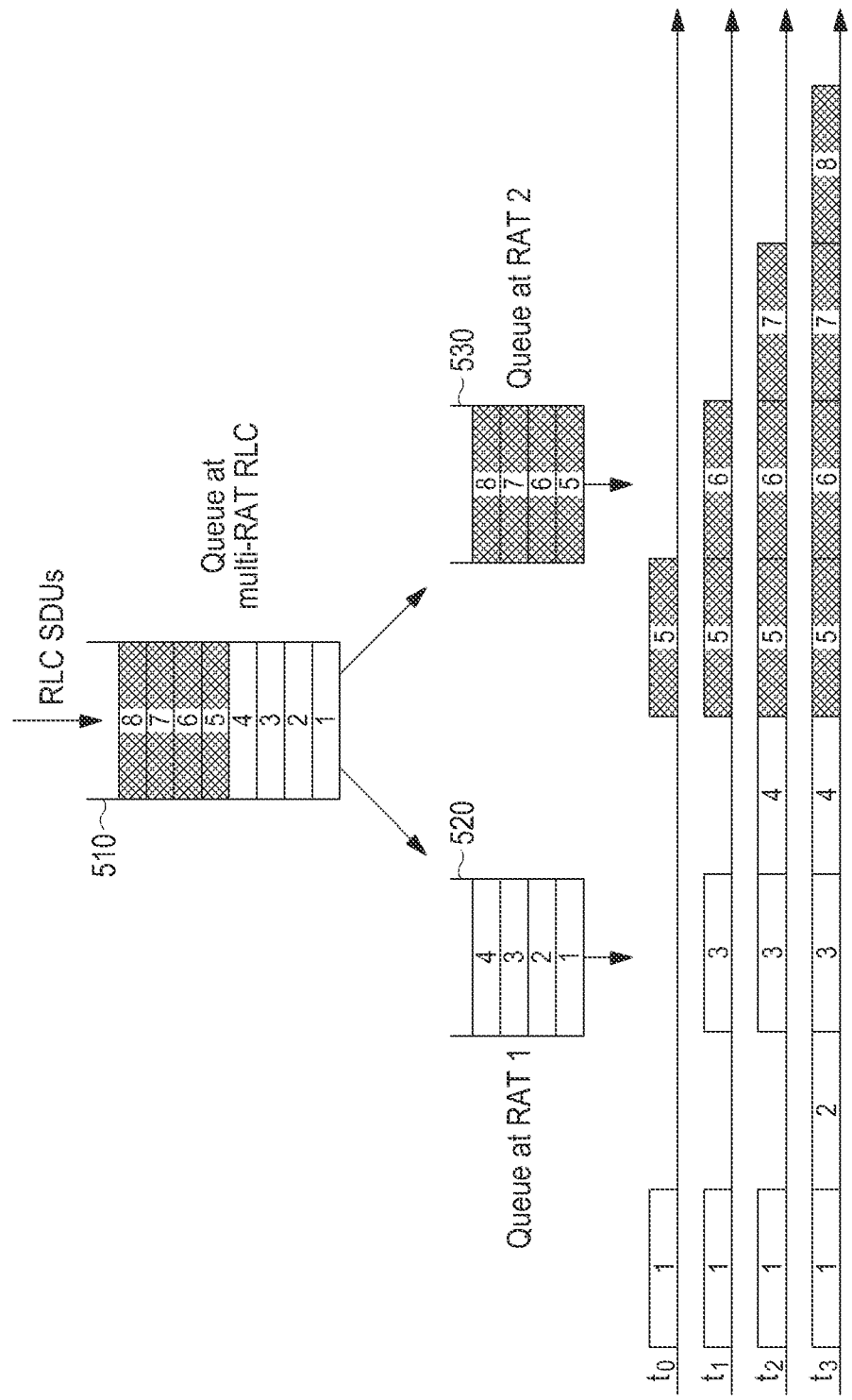
FIG. 5 illustrates a scenario where downlink packets are transmitted between a transmitting side and a receiving side communicating through a plurality of radio access links in a multi-RAT communication system according to an embodiment of the present disclosure.

FIG. 5 illustrates a scenario where downlink packets are transmitted between a transmitting side and a receiving side communicating through a plurality of radio access links in a multi-RAT communication system according to an embodiment of the present disclosure. Here, it is assumed that the transmitting side configures an RLC Service Data Unit (SDU) by a total of eight RLC PDUs 510 having sequence numbers 1 to 8 and transmits the RLC SDU to the receiving side through two RATs.

Referring to FIG. 5, a transmission buffer 510 of the transmitting side receives SDUs from a higher layer, configures the SDUs by eight RLC PDUs to be transmitted to the receiving side, and stores the eight RLC PDUs. For convenience of description, it is assumed that the transmission buffer 510 of the transmitting side allocates first four RLC PDUs of the RLC PDUs divided according to a flow allocation algorithm to a RAT 1 and next four RLC PDUs to RAT 2. Such an assumption is employed for an easy description of the status report method provided by the present disclosure, and the status report method according to the present disclosure may be more complex or may be performed with a more proper flow allocation algorithm.

More specifically, a transmission queue 520 of RAT 1 transmits each of the RLC PDUs corresponding to the sequence numbers 1 to 4 to the receiving side. In addition, a transmission queue 530 of RAT 2 transmits the RLC PDUs corresponding to the sequence numbers 5 to 8 to the receiving side based on a transmission rule of each of the RATs. In an embodiment of the present disclosure, it is assumed that the receiving side receives RLC PDU 1 corresponding to the sequence number 1 transmitted from the transmission queue 520 of RAT 1 and RLC PDU 5 corresponding to the sequence number 5 from the transmission queue 530 of RAT 2 at time t0. The RLC layer of the receiving side stores each of the sequence numbers 1 and 5 which are the highest sequence numbers among the sequence numbers of the RLC PDUs received through the RAT 1 and RAT 2 in the memory. Thereafter, the RLC layer identifies missing sequence numbers to determine a cause of an occurrence of the missing sequence numbers based on FIG. 4.

For example, the sequence number 2 which is missing at time t0 is larger than the sequence number 1 corresponding to a maximum value among the sequence numbers of the RLC PDUs received through RAT 1. However, the sequence number 2 is less than the sequence number 5 corresponding to a maximum value among the sequence numbers of the RLC PDUs received through RAT 2. In this event, it is highly likely that RLC PDU 2 corresponding to the sequence number 2 has been transmitted to RAT 1 but has not yet been received due to a transmission time difference between RAT 1 and RAT 2. Accordingly, the cause of the occurrence of the missing sequence numbers after RLC PDU 1 is determined as the "skew" status, and thus the corresponding sequence numbers are classified as the skew candidate set. Further, since the cause of the occurrence of the missing sequence number of RLC PDU 2 is initially determined as the "skew" status, the skew timer is driven. Until the driving time of the skew timer has expired, transmission of the status report of RLC PDU 2 is delayed. Similarly, the sequence numbers 3 and 4 are also classified as the skew candidate set. At this time, since the skew timer is already running by RLC PDU 2, the skew timer is not newly driven for the sequence numbers 3 and 4.

At time t1, RLC PDU 3 corresponding to the sequence number 3 is received from RAT 1 and RLC PDU 6 corresponding to the sequence number 6 is received from RAT 2. In this event, the reception RLC layer identifies missing sequence numbers in the reception buffer. For example, the sequence number 2 which is missing at time t1 is less than the sequence number 3 corresponding to a maximum value among the sequence numbers of the RLC PDUs received through RAT 1 and also less than the sequence number 6 corresponding to a maximum value among the sequence numbers of the RLC PDUs received through RAT 2. In this event, the RLC PDUs corresponding to the sequence numbers larger than the sequence number 2 have been successfully received through their own RATs. Accordingly, the cause of the occurrence of the missing sequence number 2 is determined as the "loss" status, and thus PLR PDU 2 is classified as the loss candidate set.

In contrast, at time t1, the sequence number 4 is larger than the sequence number 3 corresponding to the maximum value among the sequence numbers of the RLC PDUs received through RAT 1, so that the sequence number is classified as the skew candidate set. It is assumed that a request for a status report has been received from the transmitting side at time t1. In this event, the reception RLC layer identifies whether a current skew candidate set is empty. As a result of the identification, the sequence number 4 is included in the current skew candidate set, so that the reception RLC layer cannot immediately transmit the status report to the transmitting side. Accordingly, the reception RLC layer identifies whether the driving time of the skew timer has expired. When the driving time of the skew timer has expired, the reception RLC layer transmits the status report to the transmitting side. As a result of the identification, when the driving time of the skew timer has not expired, the RLC layer delays transmission of the status report to the transmitting side until the driving time of the skew timer has expired.

Meanwhile, at time t2, the receiving side receives RLC PDU 4 corresponding to the sequence number 4 through RAT 1 and RLC PDU 7 corresponding to the sequence number 7 through RAT 2. In this event, it is assumed that the reception RLC layer identifies missing sequence numbers in the reception buffer to find that the sequence number 2 has been continuously missing. The missing sequence number 2 is less than the "sequence number 4" corresponding to a maximum value among the sequence numbers of the RLC PDUs received through RAT 1 and also less than the "sequence number 7" corresponding to a maximum value among the sequence numbers of the RLC PDUs received through RAT 2. Accordingly, RLC PDU 2 corresponding to the sequence number 2 is determined as being in the "loss" status, and thus classified as the loss candidate set. Similarly, it is assumed that a request for a status report has been received from the transmitting side at time t2. In this event, the reception RLC layer identifies whether a current skew candidate set is empty. As a result of the identification, since the current skew candidate set is empty, the reception RLC layer generates the status report and transmits feedback to the transmitting side. At this time, the status report is configured in a form including a NACK signal indicating reception failure of RLC PDU 2.

Meanwhile, unlike a general RLC status report PDU indicating whether the corresponding RLC PDU has been successfully received by the receiving side, the RLC status report PDU according to the embodiment of the present disclosure informs of missing sequence numbers which have not yet been received due to an asymmetric transmission delay generated by a transmission time difference between different RATs of the transmitting side, that is, missing sequence numbers in the "skew" status and informs that the cause of the occurrence of the missing sequence number is the "skew" status. The RLC report status report PDU according to the embodiment of the present disclosure may have various types. For example, when there are a plurality of missing sequence numbers in the skew status, a sequence number of a first RLC PDU which has not yet been received and a number of missing sequence numbers of RLC PDUs after the first RLC PDU which are successively generated due to the skew status may be transmitted. In another example, all missing sequence numbers due to the skew status may be transmitted in a list form. In another example, all sequence numbers of which reception results should be fed back to the transmitting side may be expressed as a bitmap, and a bit corresponding to the missing sequence number generated by the skew status may be separately indicated by "0" (or "1") and then transmitted.

Figure 6:
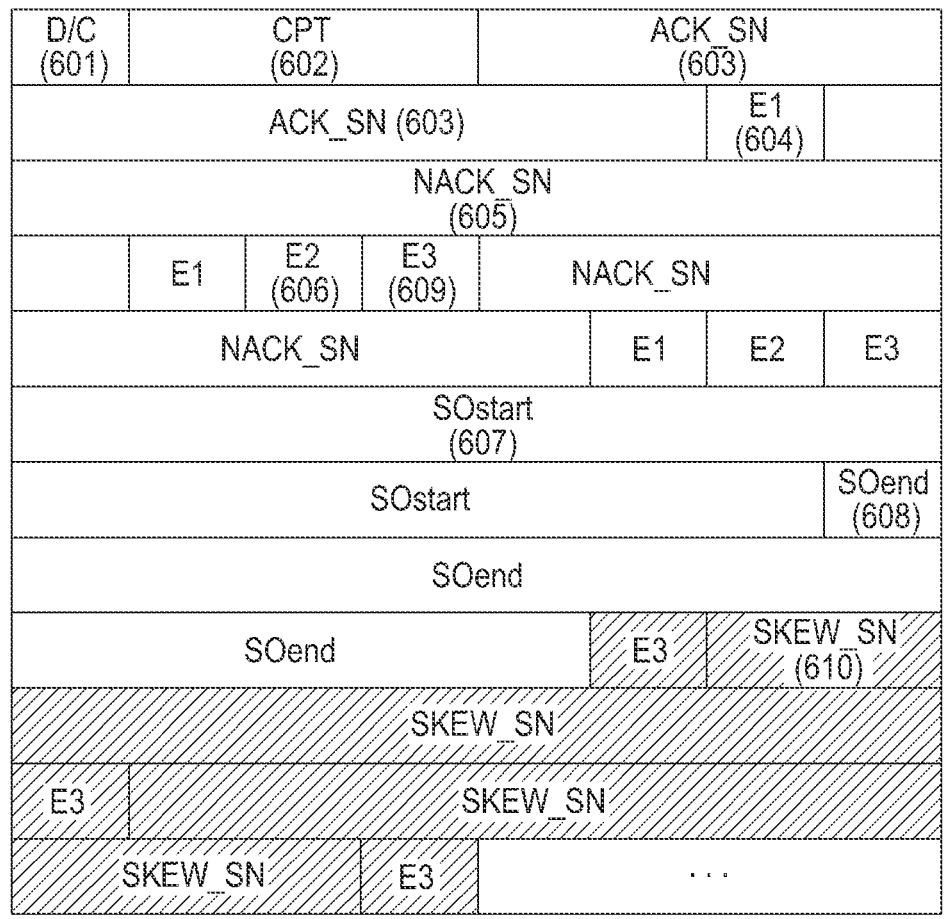
FIG. 6 illustrates a status report including information indicating a "skew" status as a cause of an occurrence of a missing sequence number according to an embodiment of the present disclosure.

FIG. 6 illustrates a status report including information indicating that a cause of an occurrence of a missing sequence number is determined as a "skew" status according to an embodiment of the present disclosure. For convenience of description, the transformation of an RLC status report PDU based on the $3^{rd}$ Generation Partnership project (3GPP) Transport Stream (TS) 36.322 RLC standard, which is one of widely used status reports, is described herein as an example. However, the report status according to the embodiment of the present disclosure may have various types.

Referring to FIG. 6, the RLC status report PDU is largely divided into an RLC control header part and an RLC PDU payload part.

The RLC control header includes a Data/Control (D/C) field 601 and a Control PDU Type (CPT) field 602. The D/C field 601 indicates whether the corresponding RCL PDU is an RLC data PDU or an RLC control PDU. At this time, it is assumed that the RLC PDU corresponds to the RLC control PDU in the RLC status report PDU. Thereafter, the CPT field 602 indicates a type of the RLC control PDU. Further, a value of the CPT field 602 may indicate that the RLC control PDU is an RLC status PDU.

The RLC PDU payload starts just after the RLC control header, and includes one ACKnowledgement_Serial Number (ACK_SN) field 603, an E1 field 604, zero or more NACK_SN fields 605, an E1 field, an E2 field 606, and an E3 field 609. According to each of the NACK_SN fields 605, an SOstart field 607 and an SOend field 608 may exist. Further, zero or more SKEW_SN fields 610 and an E3 field are included.

First, the ACK_SN field 603 indicates a sequence number of the RLC data PDU after the RLC data PDU corresponding to a maximum value of normally received sequence numbers. Thereafter, when the transmission RLC layer identifies the ACK_SN field 603 through the RLC status report PDU, the reception RLC layer recognizes that all RLC PDUs corresponding to sequence numbers before a sequence number indicated by the ACK_SN field 603 have been successfully received.

The E1 field 604 indicates whether the NACK_SN field 605, the E1 field, the E2 field, and the E3 field are followed after the ACK_SN field 603. The NACK_SN field 605 indicates a sequence number of the missing RCL PDU in the reception buffer since the reception RLC layer determines the sequence number is in the "loss" status. The E2 field 606 indicates whether the SOstart field 607 and the SOend field 608 are followed after the NACK_SN field 605. Each of the SOstart field 607 and the SOend field 608 is used to express a particular part of the lost RLC PDU indicated by the NACK_SN field 605. More specifically, the SOstart field 607 indicates a start byte of the lost RLC PDU and the SOend field 608 indicates a last byte of the lost RLC PDU. The E3 field 609 indicates whether the SKEW_SN field 610 and the E3 field are followed after the SOstart field 607 and the SOend field 608. The SKEW_SN field 610 indicates a sequence number of the RLC PDU determined as not yet being received by the reception buffer since the reception RLC layer according to an embodiment of the present disclosure has identified the sequence number as in the skew status.

Figure 7:
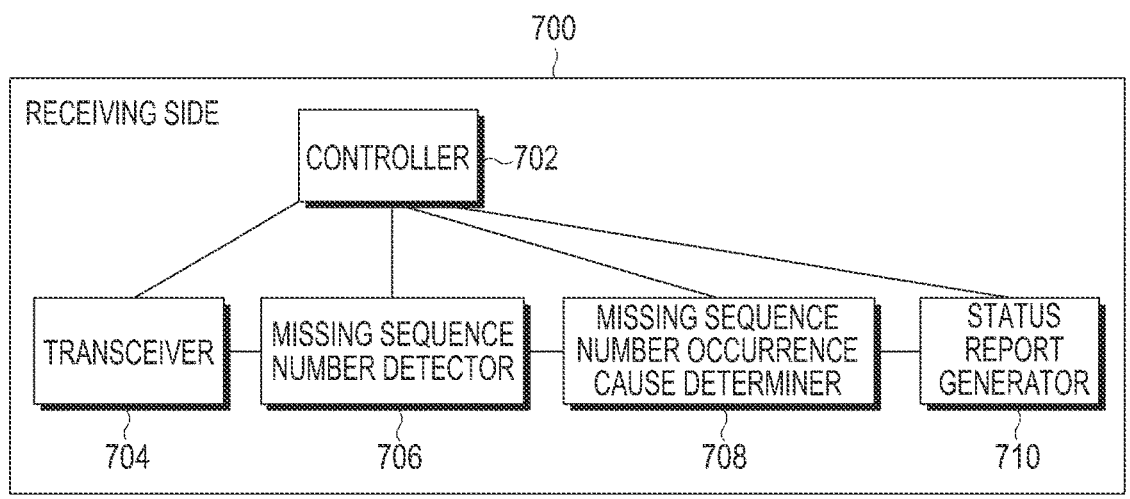
FIG. 7 illustrates a configuration of apparatuses in a receiving side according to an embodiment of the present disclosure.

FIG. 7 illustrates a configuration of apparatuses of a receiving side according to an embodiment of the present disclosure. The receiving side can also be applied to both the UE receiving the downlink of the BS and the BS receiving the uplink of the UE. For convenience of description, it is assumed hereinafter that the receiving side corresponding to the reception RCL layer of the UE receives the downlink from the BS.

Referring to FIG. 7, a receiving side 700 includes a controller 702, a transceiver 704, a missing sequence number detector 706, a missing sequence number occurrence cause determiner 708, and a status report generator 710. Components included in the receiving side 700 are schematic components performing operations according to an embodiment of the present disclosure for convenience of description, and the corresponding components may be combined into one block or divided into a plurality of blocks based on each purpose according to another embodiment of the present disclosure. The transceiver 704 receives RLC PDUs from the transmitting side and stores the received RLC PDUs in a reception buffer. Thereafter, the missing sequence number detector 706 identifies sequence numbers corresponding to the RLC PDUs stored in the reception buffer. As a result of the identification, when the missing sequence number is detected, the controller 702 controls the missing sequence number occurrence cause determiner 708 to detect a cause of an occurrence of the corresponding missing sequence number. For example, the missing sequence number occurrence cause determiner 708 compares each of one or more detected missing sequence numbers with a sequence number corresponding to maximum values among the sequence numbers of the RLC PDUs received through respective MAC layers, which are stored in the memory. Through a result of the comparison, the missing sequence number occurrence cause determiner 708 determines an RLC PDU corresponding to a sequence number less than the maximum value of the sequence numbers stored in the memory among the one or more missing sequence numbers as being in the "loss status". In contrast, through a result of the comparison, the missing sequence number occurrence cause determiner 708 determines an RLC PDU corresponding to a sequence number larger than or equal to the maximum value of the sequence numbers stored in the memory among the one or more missing sequence numbers as being in the "skew" status.

Thereafter, when the cause of the occurrence of the one or more missing sequence numbers is determined, the controller 702 controls the status report generator 710 to generate a status report including information indicating a reception result of the corresponding sequence number as an ACK signal, a NACK signal, or a skew status. The status report generated by the status report generator 710 may be configured, for example, in a form as illustrated in FIG. 5.

The controller 702 drives the skew timer at a time point when a sequence number determined as being in the skew status among the missing sequence numbers is initially determined. According to a result of the determination by the missing sequence number occurrence cause determiner 708, the controller 702 classifies the sequence numbers in the skew status as the skew candidate set and adds the sequence numbers in the loss status to the loss candidate set.

Further, the controller 702 controls the transceiver 704 to transmit the status report when the skew candidate set is empty according to the operation in FIG. 3.

The status report according to the embodiment of the present disclosure as described above further includes information on the "skew" status indicating that the cause of the occurrence of the sequence numbers of RLC PDUs which the receiving side has not yet received, that is, the cause of the occurrence of the missing sequence numbers corresponds to an asymmetric transmission delay due to a transmission time difference between different RATs. Accordingly, the transmitting side having received the status report identifies the information included in the status report so as to acquire a more accurate packet reception result transmitted by the receiving side and avoid unnecessary retransmission.

Figure 8:
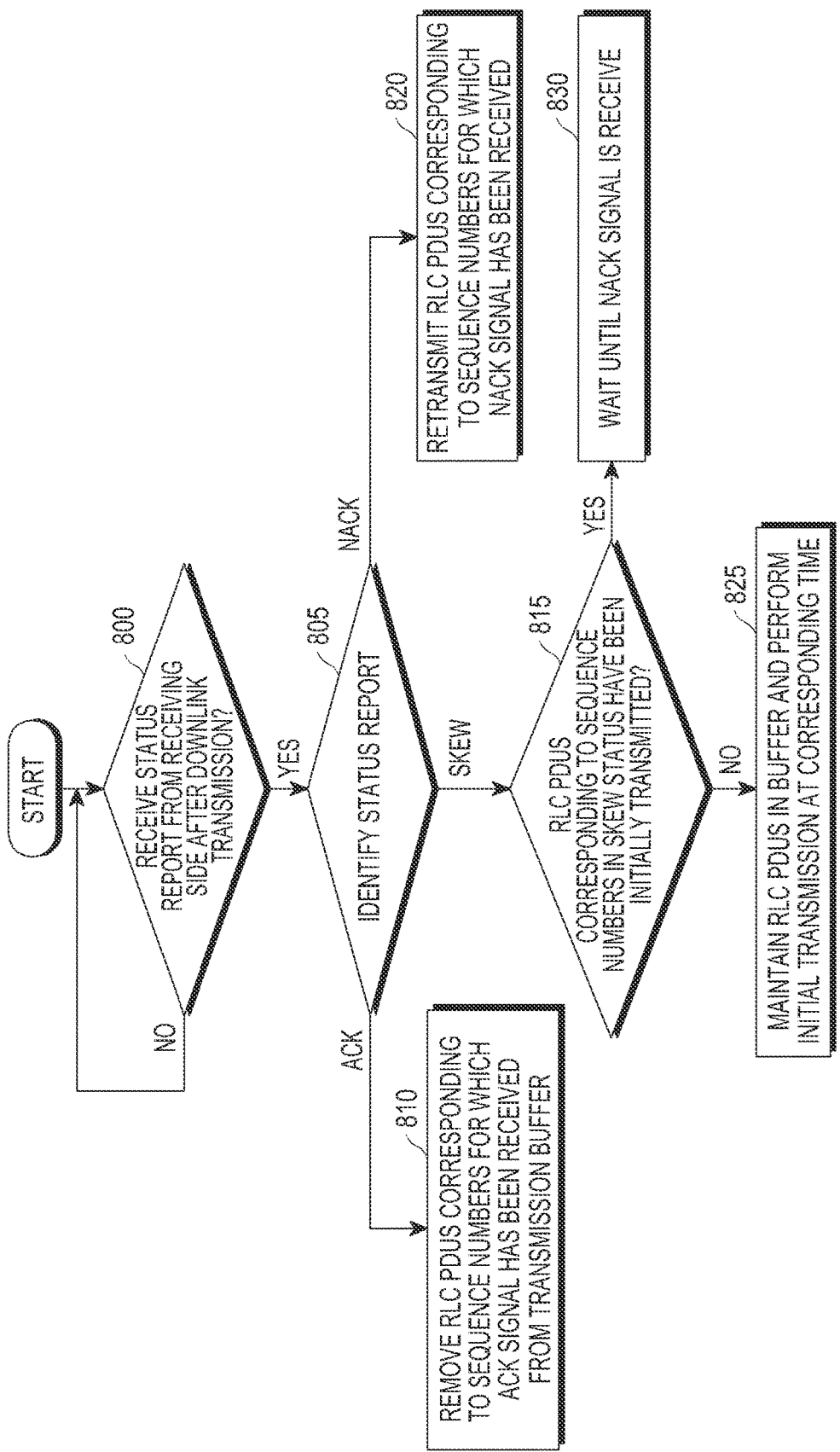
FIG. 8 is a flowchart illustrating operations of a transmitting side receiving a status report according to an embodiment of the present disclosure.

FIG. 8 is a flowchart illustrating operations of a transmitting side receiving a status report according to an embodiment of the present disclosure. The transmitting side can be applied to both the BS transmitting the downlink to the UE and the UE transmitting the uplink to the BS. For convenience of description, it is assumed that the transmitting side is the BS transmitting the downlink to the UE.

Referring to FIG. 8, in operation 800, the transmitting side transmits the downlink to the receiving side and identifies whether a status report for the transmission of the downlink is received from the receiving side. At this time, the transmitting side may make a request for feedback of the status report to the receiving side. As result of the identification, when the status report is not received, the transmitting side continuously waits to receive the status report.

As a result of the identification, when the status report is received from the receiving side, the transmitting side identifies information indicating a reception result of each transmission packet of the receiving side included in the status report in operation 805.

Through a result of the identification, the transmitting side removes transmission packets having a reception result corresponding to an ACK signal from the transmission buffer in operation 810. For example, the status report may show a maximum value of sequence numbers of the successfully received packets or lists the sequence numbers of the successfully received packets. Further, it is assumed that the transmitting side according to the embodiment of the present disclosure transmits transmission packets through a plurality of RATs. In this event, it may be assumed that the ACK signal is received for all the transmission packets which the transmitting side has completely transmitted through the corresponding RATs presently. In this event, the transmitting side may determine a current channel state of the RAT as an optimal state to set a number of retransmissions as, for example, "0".

Through a result of the identification, the transmitting side maintains transmission packets having a reception result corresponding to the NACK signal in the transmission buffer and retransmits the corresponding transmission packets according to a retransmission period in operation 820. Although not illustrated in the drawings, the transmitting side identifies the number of retransmissions of the corresponding packets, and discards a packet having the identified number of retransmissions exceeding a threshold from the transmission buffer.

Through a result of the identification, the transmitting side identifies whether each of the transmission packets having the reception result corresponding to the skew status has been initially transmitted in operation 815. Through a result of the identification, the transmitting side, in operation 825, maintains the transmission packets of which the initial transmission has not yet been received in the transmission buffer and performs the initial transmission of the transmission packets according to an initial transmission period or a determination by a transmission scheduler.

Lastly, with respect to transmission packets which are identified as being initially transmitted as a result of the identification, the transmitting side waits until reception results of the corresponding packets are received in operation 830. Although not illustrated in the drawings, the same operation as that in operation 810 is made when the ACK signal is received, and the same operation as that in operation 820 is made when the NACK signal is received. The transmitting side discards transmission packets for which the NACK signal has not been received during a time from the transmission buffer.

Figure 9:
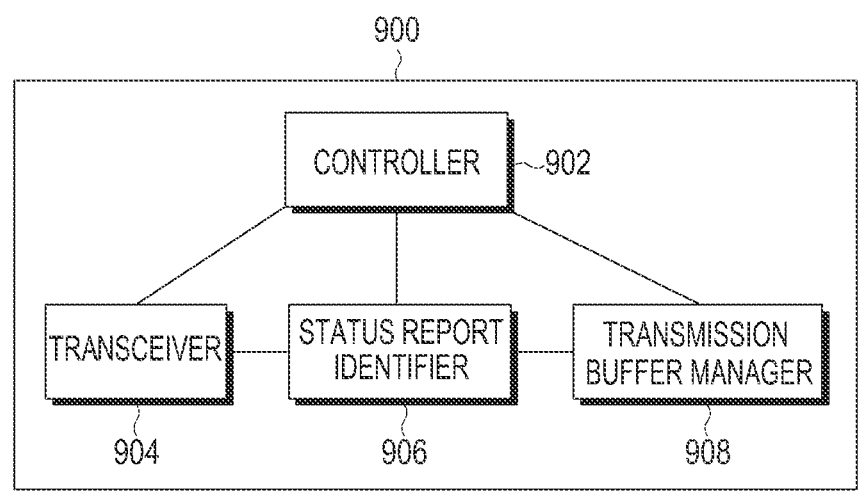
FIG. 9 illustrates a configuration of apparatuses in a transmitting side according to an embodiment of the present disclosure.

FIG. 9 illustrates a configuration of apparatuses of a transmitting side according to an embodiment of the present disclosure.

Referring to FIG. 9, a transmitting side 900 includes a controller 902, a transceiver 904, a status report identifier 906, and a transmission buffer manager 908. Components included in the transmitting side 900 are schematic components performing operations according to an embodiment of the present disclosure for convenience of description, and corresponding components may be combined into one block or divided into a plurality of blocks based on each purpose according to another embodiment of the present disclosure.

The transceiver 904 transmits packets in the transmission buffer to the receiving side. Thereafter, the controller 902 waits to receive status reports of the packets through the transceiver 904. At this time, the controller 902 may control to transmit a request for the status report to the receiving side.

Meanwhile, when the transceiver 904 identifies the reception of the status report, the controller 902 controls the status report identifier 906 to identify information indicating a reception result of each transmission packet of the receiving side included in the status report.

Through a result of the identification, the controller 902 controls the transmission buffer manager 908 to remove transmission packets having the reception result corresponding to the ACK signal from the transmission buffer. Further, it is assumed that the transmitting side according to the embodiment of the present disclosure transmits transmission packets through a plurality of RATs. In this event, it may be assumed that the ACK signal is received for all the transmission packets which the transmitting side has completely transmitted through the corresponding RATs. In this event, the transmitting side may determine a current channel state of the RAT as an optimal state to set a number of retransmissions as, for example, "0".

Through a result of the identification, the controller 902 controls the transmission buffer manager 908 to maintain transmission packets having the reception result corresponding to the NACK signal in the transmission buffer. Further, the controller 902 controls the transceiver 904 to retransmit the corresponding transmission packets according to a retransmission period. Although not illustrated in the drawings, the controller 902 identifies a number of retransmissions of the corresponding transmission packets and controls the transmission buffer manager 908 to remove transmission packets having the identified number of retransmissions exceeding a threshold from the transmission buffer. Through a result of the identification, the controller 902 identifies whether each of the transmission packets having the reception result corresponding to the skew status has been initially transmitted. The controller 902 controls the transmission buffer manager 908 to maintain transmission packets which are identified as being the initial transmission in the transmission buffer. Further, the controller 902 performs the initial transmission through the transceiver 904 according to an initial transmission period. Lastly, with respect to transmission packets which are identified as not being the initial transmission, the controller 902 waits until the ACK signal or the NACK signal is received for the corresponding packets through the transceiver 904.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving packets by a user equipment (UE) in a communication system, the method comprising:
   receiving, from a base station, first packets transmitted based on a first radio access technology (RAT) and second packets transmitted based on a second RAT, the second RAT using a communication protocol that is different from a communication protocol used in the first RAT;
   storing first sequence numbers of the first packets and second sequence numbers of the second packets in a buffer;
   in response to detecting missing sequence numbers among the first sequence numbers and the second sequence numbers within the buffer, determining that at least one packet corresponding to at least one sequence number among the missing sequence numbers has not been received due to either a reception failure by packet loss or an asymmetric transmission delay resulting in a reception time difference between the first packets and the second packets;
   in response to the determining that the at least one packet has not been received due to the asymmetric transmission delay, starting a timer for delaying transmission of a report message, and classifying the at least one sequence number of the at least one packet that has not been received due to the asymmetric transmission delay, into a set;

determining whether the set including the at least one sequence number is empty;

if the set is not empty, determining whether the timer is expired, and if the timer is expired, transmitting, the report message; and if the set is empty, transmitting the report message without determining whether the timer is expired.

2. The method of claim 1, wherein the transmitting of the report message comprises:

determining whether there is an additional missing sequence number;

if there is no additional missing sequence number, determining whether there is a sequence number classified into a set of sequence numbers to be received due to the asymmetric transmission delay among the missing sequence numbers; and if there is not the sequence number, transmitting the report message.

3. The method of claim 1, wherein if the at least one packet has not been received due to the packet loss, the report message comprises information indicating a packet corresponding to a sequence number has not been received due to the packet loss among the missing sequence numbers.

4. The method of claim 1, wherein the determining that the at least one packet has not been received due to the asymmetric transmission delay comprises:

comparing the at least one sequence number with a minimum value among a first maximum value of the first sequence numbers and a second maximum value of the second sequence numbers;

if there the at least one sequence number is greater than the minimum value, then the report message comprises the information indicating that the at least one packet has not been received due to the asymmetric transmission delay; and if the at least one sequence number is less than the minimum value, determining reception failure of the at least one packet.

5. The method of claim 1, wherein, if a plurality of packets corresponding to the missing sequence numbers which have not been received due to the asymmetric transmission delay, the report message further comprises a first missing sequence number among the missing sequence numbers and a number of missing sequence numbers which are successively generated due to the reception time difference after the first missing sequence number.

6. A user equipment (UE) for receiving packets in a communication system, the UE comprising:

a transceiver configured to receive, from a base station, first packets transmitted based on a first radio access technology (RAT) and second packets transmitted based on a second RAT, the second RAT using a communication protocol that is different from a communication protocol used in the first RAT; and at least one processor configured to:

store first sequence numbers of the first packets and second sequence numbers of the second packets in a buffer, in response to detecting missing sequence numbers among the first sequence numbers and the second sequence numbers within the buffer, determine that at least one packet corresponding to at least one sequence number among the missing sequence numbers has not been received due to either a reception failure by packet loss or an asymmetric transmission delay resulting in a reception time difference between the first packets and the second packets, in response to the determining that the at least one packet has not been received due to the asymmetric transmission delay, start a timer for delaying transmission of a report message, classifying the at least one sequence number of the at least one packet that has not been received due to the asymmetric transmission delay, into a set, determine whether the set including the at least one sequence number is empty, if the set is not empty, determining whether the timer is expired, and if the timer is expired, control to transmit the report message, and if the set is empty, transmitting the report message without determining whether the timer is expired.

7. The UE of claim 6, wherein the at least one processor is further configured to:

determine whether there is an additional missing sequence number, and if there is no additional missing sequence number, determine whether there is a sequence number classified into a set of sequence numbers to be received due to the asymmetric transmission delay among the missing sequence numbers, and wherein the transceiver is further configured to, if there is not the sequence number, transmit the report message.

8. The UE of claim 6, wherein if the at least one packet has not been received due to the packet loss, the indication information comprises information indicating a packet corresponding to a sequence number has not been received due to the packet loss among the missing sequence numbers.

9. The UE of claim 6, wherein the at least one processor is further configured to:

compare the at least one sequence number with a minimum value among a first maximum value of the first sequence numbers and a second maximum value of the second sequence numbers, if the at least one sequence number is greater than the minimum value, control the report message comprising information to indicate that the at least one packet has not been received due to the asymmetric transmission delay, and if the at least one sequence number is less than the minimum value, determine reception failure of the at least one packet.

10. The UE of claim 6, wherein if a plurality of packets corresponding to the missing sequence numbers which have not been received due to the asymmetric transmission delay, the indication information comprises a first missing sequence number among the missing sequence numbers and a number of missing sequence numbers which are successively generated due to the reception time difference after the first missing sequence number.

* * * * *